(12) United States Patent
Shetty et al.

(10) Patent No.: US 9,491,050 B2
(45) Date of Patent: Nov. 8, 2016

(54) SYSTEMS AND METHODS FOR INFRASTRUCTURE TEMPLATE PROVISIONING IN MODULAR CHASSIS SYSTEMS

(71) Applicants: Sudhir V. Shetty, Cedar Park, TX (US); Wayne R. Weilnau, Austin, TX (US)

(72) Inventors: Sudhir V. Shetty, Cedar Park, TX (US); Wayne R. Weilnau, Austin, TX (US)

(73) Assignee: Dell Products LP, Round Rock, TX (US)

( * ) Notice: Subject to any disclaimer, the term of this patent is extended or adjusted under 35 U.S.C. 154(b) by 487 days.

(21) Appl. No.: 13/955,423

(22) Filed: Jul. 31, 2013

(65) Prior Publication Data
US 2015/0039871 A1 Feb. 5, 2015

(51) Int. Cl.
G06F 15/16 (2006.01)
H04L 12/24 (2006.01)
G06F 9/50 (2006.01)

(52) U.S. Cl.
CPC ......... *H04L 41/0806* (2013.01); *G06F 9/5011* (2013.01)

(58) Field of Classification Search
None
See application file for complete search history.

(56) References Cited

U.S. PATENT DOCUMENTS

| | | |
|---|---|---|
| 2006/0190532 A1 | 8/2006 | Chadalavada |
| 2006/0212143 A1 | 9/2006 | Nguyen et al. |
| 2011/0093594 A1* | 4/2011 | Raymond ........... H04L 12/5695 709/225 |
| 2013/0036208 A1* | 2/2013 | Dochez ................ G06F 9/5077 709/220 |

OTHER PUBLICATIONS

Dell, Dell Active System Manager, Obtained from Internet Jul. 16, 2013, 2 pgs.
Dell, Dell Active System Manager 7.1, Obtained from Internet Jul. 15, 2013, 2 pgs.
Dell, Power Edge VRTX, Technical Guide, Obtained from Internet Jul. 24, 2013, 45 pgs.
Dell, Power Edge M420, Technical Guide, Obtained from Internet Jul. 12, 2013, 46 pgs.
Dell, Power Edge M1000e, Technical Guide, Obtained from Internet Jul. 12, 2013, 72 pgs.
Dell, Dell Enterprise White Paper, Dell Power Edge M1000e Modular Enclosure Architecture, Jan. 2008, 42 pgs.

(Continued)

*Primary Examiner* — Scott B Christensen
(74) *Attorney, Agent, or Firm* — Egan Peterman Enders Huston

(57) ABSTRACT

Systems and methods for provisioning the infrastructure of modular information handling systems, such as modular blade server chassis systems, using one or more pre-defined templates. IT service templates may be initially loaded and present in local memory or storage of a modular information handling system to define the system infrastructure configuration that ship with the modular chassis platform, or may be later downloaded or otherwise received in local memory or storage later from an external source after system installation to specify the desired end-state of the system infrastructure configuration.

27 Claims, 4 Drawing Sheets

(56) References Cited

OTHER PUBLICATIONS

Dell, Systems Management, OpenManage Essentials—Discover, Monitor, Inventory and Update Dell Servers, Storage and Networking, Obtained from Internet May 8, 2013, 11 pgs.
Cisco, Cisco UCS Manager Architecture, White Paper, Obtained from Internet May 8, 2013, 11 pgs.
Cisco, Cisco UCS Manager Configuration Common Practices and Quick Start Guide, Obtained from Internet May 8, 2013, 29 pgs.
Dell Management Plug-In for VMware vCenter, OpenMange Essentials-Discover, Monitor, Inventor and Update Dell Servers, Storage, and Networking, Obtained from Interrnet Jul. 30, 2013, 11 pgs.
Rahardjo et al., "Systems and Methods for Power Supply Configuration and Control", Dell:154, U.S. Appl. No. 13/746,113, filed Jan. 21, 2013, 34 pgs.
Dell, "Active System Manager User Guide", Release 7.0, Mar. 2013, 390 pgs.
Dell, "Dell Management Plug-In for VMware vCenter, User's Guide", Release 1.6, Obtained from Internet May 8, 2013, 99 pgs.
Dell, "Active System Manager Web Interface User Guide", Release 7.0, Mar. 2013, 170 pgs.
Dell, "PowerEdge M1000e, Technical Guide", Obtained from Internet Jul. 12, 2013, 73 pgs.

\* cited by examiner

US 9,491,050 B2

SYSTEMS AND METHODS FOR INFRASTRUCTURE TEMPLATE PROVISIONING IN MODULAR CHASSIS SYSTEMS

FIELD OF THE INVENTION

This application relates to information handling systems, and more particularly to provisioning for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional modular blade server chassis systems are a type of scalable information handling system that incorporate compute, network and storage infrastructure components within a physical chassis form factor. Each such server platform has unique characteristics in terms of how the compute, networking and storage resources are connected and provisioned. One example of such a conventional modular server chassis is a Dell Power Edge M1000e modular blade server chassis available from Dell Products L.P. of Round Rock, Tex. Such a modular chassis platform can include different height blades (full-height, half-height and quarter-height blades), multiple redundant network I/O fabrics (A, B, and C fabrics that may be for example, Gigabit Ethernet "GE", Fibre Channel "FC" or InfiniBand "IB") and Dell EqualLogic blade storage arrays. The Dell M1000e chassis also includes one or more Chassis Management Controllers (CMCs) that provide administrator access for tasks such as inventory, configuration, remote power-up, monitoring, alerts, and to perform management of chassis operations such as security, power, and cooling. In some cases, a server chassis platform also can include direct attached storage (DAS) storage, and the CMC enables the ability to create virtual disks that can be assigned to one or more compute blades of the system.

In the past, templates have been employed by external provisioning tools to provision modular blade server chassis. Such an external tool is remotely deployed and executed on hardware that is remote from a modular blade server chassis system which it is provisioning. It is configured at a user console, and uses multiple remote protocols, e.g., web services management "WS-MAN" to a remote access controller known as iDRAC, telnet/secure shell "SSH" to network switches, proprietary storage application programming interfaces to EqualLogic PS-M4110 storage blades or WS-MAN/racadm command line interface to a chassis management controller (CMC).

An administrator attempting to provision the infrastructure of a conventional scalable chassis platform using a conventional external provisioning tool must potentially navigate through multiple user interfaces (UIs) or command line interfaces (CLIs) in order to provision the infrastructure to meet an information technology (IT) service requirement. The administrator must also provision the compute infrastructure (e.g., BIOS, boot sequence, internal RAID drives, converged network adapters "CNAs"), configure the Internet Small Computer System Interface "iSCSI" storage (e.g., size, thin/thick provisioning) or DAS storage (e.g., size, RAID level), and make assignments to compute and configure the network fabric parameters (stacking, link aggregation groups "LAGs", virtual local area networks "VLANs"). This provisioning process can also differ depending on the particular platform, firmware revision and incremental platform revision of a given system. The conventional external tool must also keep pace with different platform generations (as well as changes within a given platform generation) with different capabilities that causes churn in terms of solution delivery and maintainability. This requires the use of external up-stream tools/processes (e.g., management consoles/CLIs) that need to change every time a new platform or platform update is released.

SUMMARY OF THE INVENTION

Disclosed herein are systems and methods for provisioning the infrastructure of modular information handling systems, such as modular blade server chassis systems, using one or more pre-defined templates. In one embodiment, a predefined IT service template may define the resource requirements of one or more IT services, and may define the desired end-state of the system infrastructure configuration (e.g., configuration of compute, networking and storage resources as well as any physical connectivity requirements) to enable the system infrastructure to host the service/s. In another embodiment, IT service templates may be initially loaded and present in local memory or storage of a modular information handling system to define the system infrastructure configuration that ship with the modular chassis platform, or may be later downloaded or otherwise received in local memory or storage later from an external source after system installation to specify the desired end-state of the system infrastructure configuration, e.g., such as an updated or revised configuration.

Advantageously, a local management subsystem (e.g., such as a system CMC with firmware) or other intelligence integrated within a chassis system may in one embodiment interpret and execute the predefined templates without assistance from an external console, thus enabling the management subsystem to make optimal choices based on the current hardware capabilities and firmware revision of the system. For example, a set of pre-defined templates may be initially provided as part of management subsystem firmware for the chassis system. The firmware may additionally and/or alternatively import a set of templates from an external URL (e.g. from a system provider Tech Center or from a system provider online website).

Further advantageously, the disclosed systems and methods may be implemented in a manner that simplifies modular chassis infrastructure provisioning towards reaching an IT service deployment goal. In this regard, the disclosed systems and methods may be implemented to automate modular chassis configuration in a manner that enables quick and rapid configuration of a modular chassis infrastructure, e.g., for chassis installations located at branch offices or remote offices which have minimal or no information technology (IT) staff. Further, the disclosed systems and methods may be implemented with the ability to create IT service templates and ship them with the platform and/or to provide IT service templates that are downloadable from a system provider website or from a community site.

In one respect, disclosed herein is a scalable information handling chassis system having chassis information technology (IT) resources, the chassis system including at least one local processing device configured to query an inventory of at least one of actual chassis IT resources of the information handling chassis system, an actual physical connectivity between the actual chassis IT resources of the information handling chassis system, or a combination thereof. The at least one processing device of the chassis system may be configured to then perform at least one of the following tasks: determine if the actual chassis IT resources of the information handling chassis system are capable of implementing at least one IT service of a locally deployed pre-defined IT service template, or determine if the actual physical connectivity between the actual chassis IT resources of the information handling chassis system is capable of fulfilling the required physical connectivity between the chassis IT resources to implement the at least one IT service of a locally deployed pre-defined IT service template, or a combination thereof. The at least one processing device of the chassis system may be configured to then provision the infrastructure of the scalable information handling chassis system according to the locally deployed pre-defined IT service template only if at least one of the following conditions exist: the actual chassis IT resources of the information handling chassis system is determined to be capable of implementing the at least one IT service of the locally deployed pre-defined IT service template, or the actual physical connectivity between the actual chassis IT resources of the information handling chassis system is capable of fulfilling the required physical connectivity between the chassis IT resources, or a combination thereof. In one embodiment, the locally deployed pre-defined IT service template may define the resource requirements for implementing the at least one IT service on the scalable information handling chassis system, with the defined resource requirements including at least one of required chassis IT resources, required physical connectivity between chassis IT resources, or a combination thereof.

In another respect, disclosed herein is a method for provisioning the infrastructure of a scalable information handling chassis system having chassis information technology (IT) resources. The method may include: using at least one local processing device of the information handing chassis system to query an inventory of at least one of actual chassis IT resources of the information handling chassis system, an actual physical connectivity between the actual chassis IT resources of the information handling chassis system, or a combination thereof. The method may include then using at least one local processing device of the information handling chassis system to at least one of: determine if the actual chassis IT resources of the information handling chassis system are capable of implementing at least one IT service of a locally deployed pre-defined IT service template, or determine if the actual physical connectivity between the actual chassis IT resources of the information handling chassis system is capable of fulfilling the required physical connectivity between the chassis IT resources to implement the at least one IT service of a locally deployed pre-defined IT service template, or a combination thereof. The method may further include using at least one local processing device of the information handling chassis system to provision the infrastructure of the scalable information handling chassis system according to the locally deployed pre-defined IT service template only if at least one of the following conditions exist: the actual chassis IT resources of the information handling chassis system is determined to be capable of implementing the at least one IT service of the locally deployed pre-defined IT service template, or the actual physical connectivity between the actual chassis IT resources of the information handling chassis system is capable of fulfilling the required physical connectivity between the chassis IT resources, or a combination thereof. In one embodiment, the locally deployed pre-defined IT service template may define the resource requirements for implementing the at least one IT service on the scalable information handling chassis system, the defined resource requirements including at least one of required chassis IT resources, required physical connectivity between chassis IT resources, or a combination thereof.

DESCRIPTION OF ILLUSTRATIVE EMBODIMENTS

Figure 1:
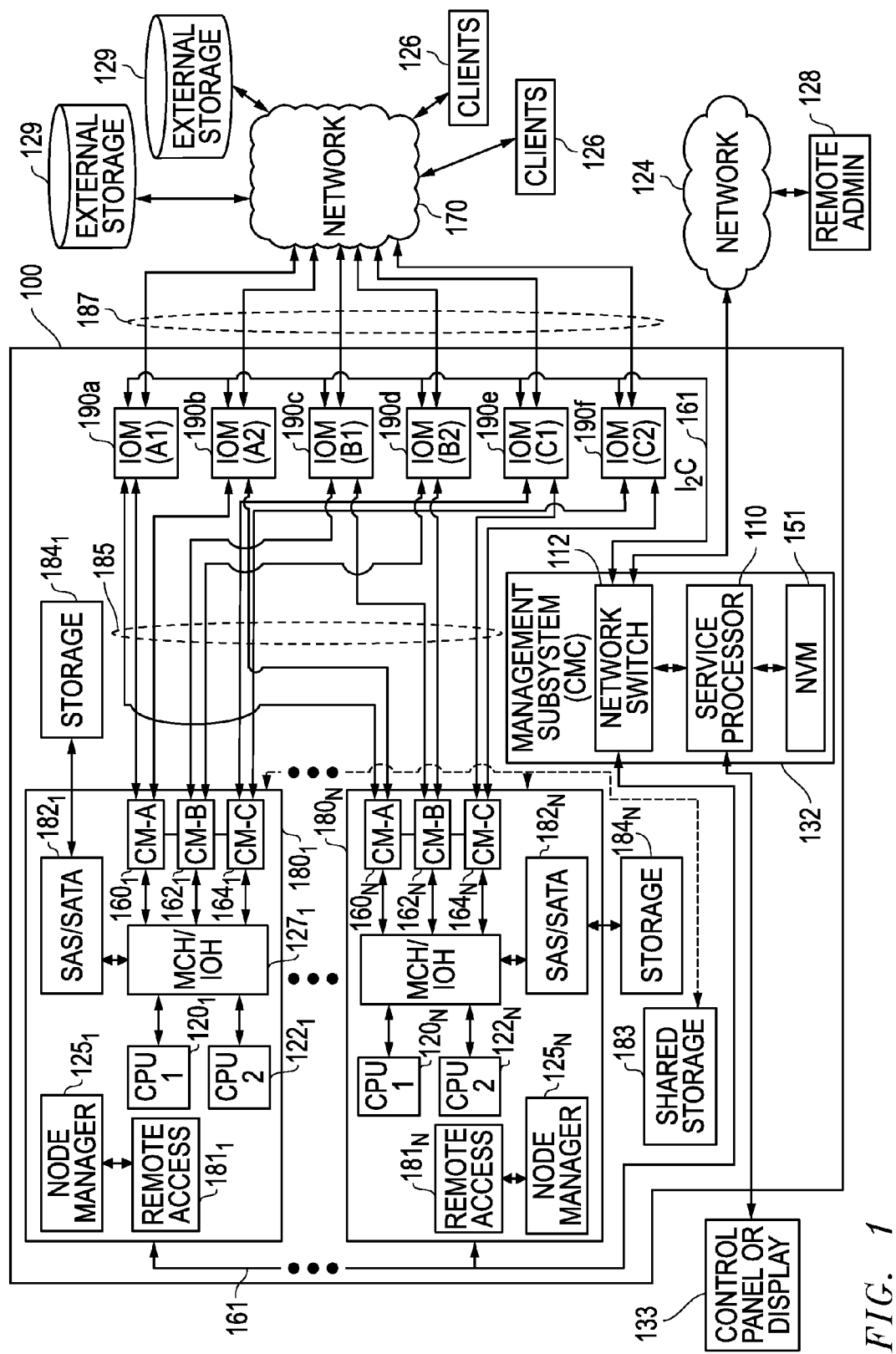
FIG. 1 illustrates a simplified block diagram of an information handling system as it may be configured according to one exemplary embodiment of the disclosed systems and methods.

FIG. 1 is a block diagram illustrating one exemplary embodiment of a scalable information handling system configured in the form of a modular blade server chassis system that includes a chassis 100 having an outer structural physical framework within which various indicated compute, networking and storage resources of FIG. 1 are contained, with provision for connection to various external networks and devices as shown. In this embodiment, individual modular compute, networking and/or storage resources may be added and/or removed from the system 100 (e.g., as removable and/or hot-pluggable modular components) and/or reconfigured over time so as to change the capabilities and/or performance of the system. Connectivity between modular compute, networking and/or storage resources may also be reconfigured within the chassis 100. It will be understood that although FIG. 1 illustrates a particular exemplary embodiment of a modular blade server chassis system 100, the disclosed systems and methods may be alternatively implemented with any other configuration of scalable information handling system that utilizes compute, networking and/or storage resources that are removable, hot-pluggable, or otherwise changeable over time, possibly together with the configured connectivity between these resources.

Referring to FIG. 1 in more detail, system 100 includes a plurality of information handling system compute nodes configured in the form of multiple removable or hot-pluggable modular blade servers $180_1$ to $180_N$ that may be removably coupled to system network communications and power, e.g., via a backplane or midplane. As shown, in this exemplary embodiment each of blade servers $180_1$ to $180_N$ includes two central processing units (CPUs) 120 and 122 executing an in-band (e.g., host) operating system (OS) although it is possible that each blade server 180 may have only one CPU or may be provided with more than two CPUs. Each of CPUs 120 and 122 of a given blade 180 are coupled to memory controller hub/IO hub circuitry 127 of the blade 180, which is in turn coupled to multiple communication modules (CMs) 160, 162 and 164 that handle network communications between multiple network fabric links 185 (e.g., implementing fabrics A, B and C in this embodiment) and the CPUs and other components of each blade 180 as shown. Examples of suitable communication modules 160, 162 and 164 include, for example, LAN-on-motherboard modules (LOMs) supporting Gigabit Ethernet and/or removable or pluggable (customizable) mezzanine cards supporting other fabric protocols such as Gigabit Ethernet, PCIe, SATA, SAS, Fibre Channel, etc. Further, each of fabrics A, B and C may support different communication types or protocols.

As shown in FIG. 1, each of blade servers $180_1$ to $180_N$ may be optionally provided with local storage 184, e.g., in the form of one or more removable or hot-pluggable hard disk drives (HDD) that may be coupled via a local storage controller 182 to implement local storage for blade servers 180. Local controllers 182 may be configured to communicate with local storage 184 using any suitable interface standard (e.g., Serial Attached SCSI (SAS), Serial Advanced Technology Attachment (SATA)), and in one exemplary embodiment may be configured to implement RAID functionality. Further, optional shared storage 183 (e.g., one or more removable and/or pluggable disk drives) may also be provided that is accessible by each of blade servers $180_1$ to $180_N$ e.g., via a backplane or midplane.

It will be understood that the particular illustrated components of each blade server 180 are exemplary only, and that additional, fewer, and/or alternative components may be present. For example, individual blade servers 180 may also include additional or alternative components such as baseboard management controllers (BMCs) that may execute out-of-band programming, random access memory (RAM) and/or non-volatile random access memory (NVRAM) that may be present for purposes of saving and/or retrieving information used by the corresponding CPUs 124 and/or BMC of the same blade server 180, etc.

Still referring to FIG. 1, each of network fabric links 185 may be any type and bandwidth network communication link that is suitable for communicatively coupling communication modules 160, 162 and 164 of server blades 180 with external network fabric connections 187 through IOMs 190, which provide physical (PHY) layer connection path/s for external network communications. Examples of suitable types of communication protocols across network fabric links 185 include, but are not limited to, Gigabit Ethernet, PCIe, SATA, SAS, Fibre Channel, etc. such as described above. Additionally, each of network fabric links 185 may be single lane or multi-lane in configuration. In the illustrated embodiment, six input/output modules (IOMs) 190 are provided for each blade server 180 to handle communications with external devices (e.g., such as external clients 126 and external storage devices 129) via external network/s 170, e.g., Internet, corporate intranet, local area network (LAN), storage area network (SAN), interprocessor communications (IPC), etc. Examples of types of external network communications that may be supported by IOMs 190 include, but are not limited to Ethernet, Fibre Channel, Infiniband, etc. Examples of specific types of IOMs 190 include, but are not limited to, pass-through TOM modules that may provide 1:1 connection from each server blade 180 to external network/s, and switch TOM modules that logically combine multiple streams of data from multiple respective server blades 180 onto a fewer number of external network communication streams.

In the illustrated embodiment, two redundant communication links and IOMs 190 are provided between each of communication modules 160, 162 and 164 for each of fabrics A, B and C, although it will be understood that such redundancy is optional. Moreover, it will be understood that greater than or less than three CMs may be present on each blade 180 in other embodiments, and/or that a greater or lesser number of network fabric links 185 and corresponding IOMs 190 may be present in other embodiments. In this regard, it will be understood that the number of CMs, fabric communication links 185, and IOMs 190 may independently be varied vary as needed or desired to fit a given system application, and may further change over time, e.g., to fit changing system needs.

As further shown in FIG. 1, server chassis system 100 may include a local management subsystem or Chassis Management Controller (CMC) 132 contained within the chassis that includes a local processing device in the form of an embedded service management processor 110 (e.g., such as a baseboard management controller (BMC) microcontroller or any other suitable type of processing device) together with an optional network switch 112 that interfaces with external entities across network 124, e.g., Internet, corporate intranet, etc. In one embodiment, embedded service management processor 110 may be employed to perform the processing tasks described herein for management subsystem (CMC) 132. Further, management subsystem (CMC) 132 may also include integral non-volatile memory 151 (e.g., such as NVRAM) coupled to embedded service management processor 110 (or alternatively may be coupled to external non-volatile memory) to facilitate the accomplishment of tasks of management subsystem (CMC) 132 as described further herein.

As shown, management subsystem (CMC) 132 may be coupled via network 124 to remote administrator/s 128 and/or directly to an optional local control panel and/or display and user interface 133 for displaying information and for local administrator interface to server rack system 100. In one embodiment, management subsystem 132 may provide local and/or remote control, reproduction and display of server operating parameters, for example, by out of band methods such as Web graphical user interface (GUI) using an integrated Dell Remote Access Controller (iDRAC) available from Dell Products L.P. of Round Rock, Tex. and/or textually via Intelligent Platform Management Interface (IPMI), Dell Remote Access Controller (RACADM) or WS Management (WS-MAN). Further information on remote access controllers may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

As further shown in FIG. 1, each of blade servers $180_1$ to $180_n$ may include a respective node manager 125 configured for communication with management subsystem 132 (e.g., via a respective remote access controller 181 of the same server blade 180 such as integrated Dell Remote Access Controller (iDRAC) available from Dell Products L.P. of Round Rock, Tex.). In such an embodiment, each node manager $125_1$ to $125_N$ may exchange management information (e.g., such as component status, component inventory, component configuration, alerting, power status and control commands, component operation monitoring, etc.) information with management subsystem (CMC) 132 of system 100 across any suitable type of management communication path 161 (e.g., $I^2C$ bus). In one exemplary embodiment, each node manager 125 may be implemented by a chipset, e.g., such as an Intel C600 Patsburg NodeManager, or in a separate host I/O controller, or a dedicated microprocessor, etc. However, it will be understood that the tasks of one or more node manager/s 125 may be alternatively performed, for example, by service processor 110 or other processing device within management subsystem 132.

Also as shown, management subsystem 132 may also be similarly coupled to exchange management information with IOMs 190 and other components (e.g., such as power supply units, cooling fans, etc.) across management communication path 161 and/or other suitable management communication path/s. In this way, the management communication architecture of FIG. 1 may be employed to allow management subsystem 132 to monitor system and component status and operation, as well as to configure and control operation of individual components and groups of components to implement and/or change particular system architectures and/or operations, e.g., in a manner so as to implement the provisioning tasks as described elsewhere herein. Further information on exemplary management subsystem operations and configuration which may be implemented with modular chassis systems in the practice of the disclosed systems and methods may be found in U.S. patent application Ser. No. 13/746,113 filed on Jan. 21, 2013, which is incorporated herein by reference in its entirety.

Figure 2:
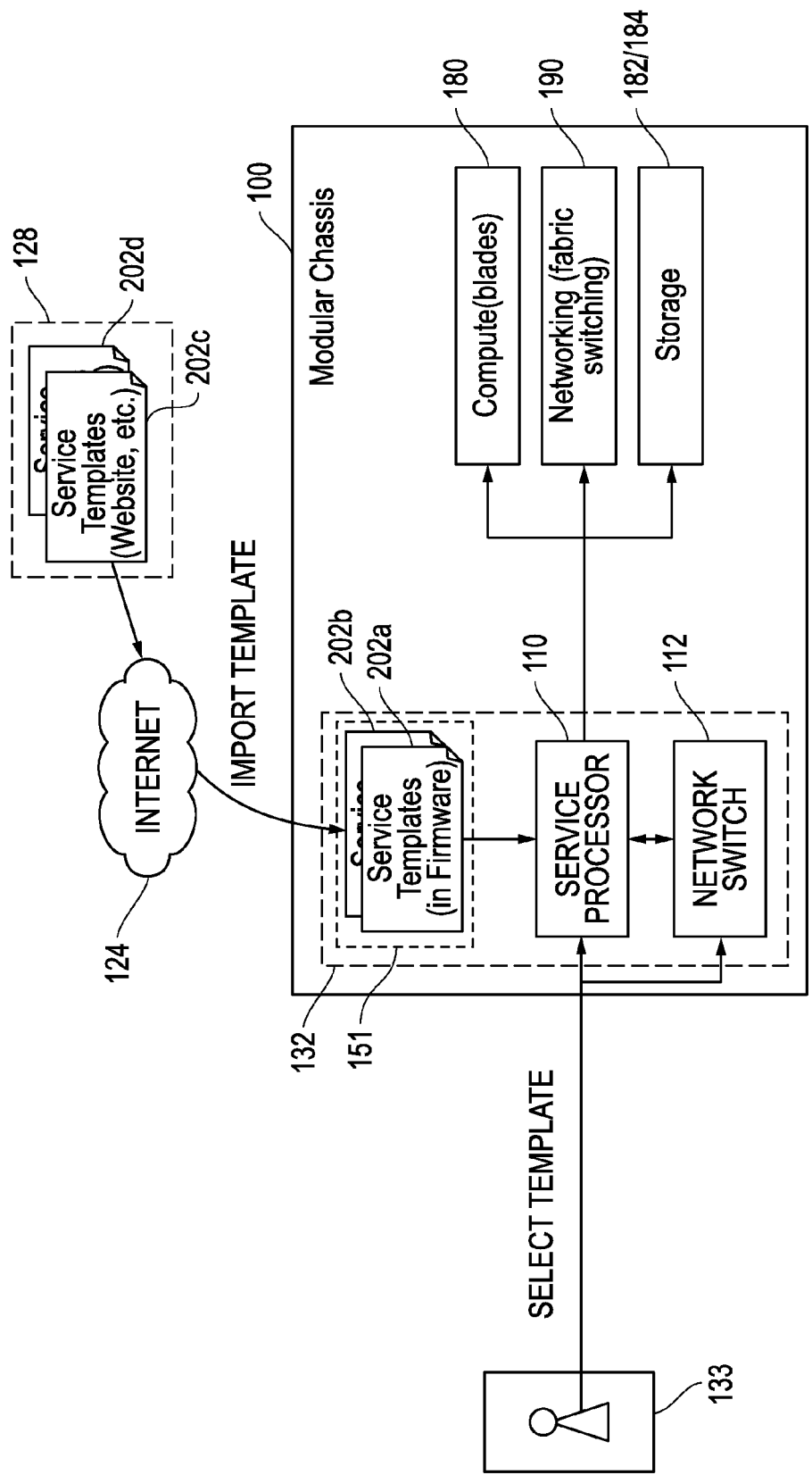
FIG. 2 illustrates a block diagram view of a modular blade server chassis system according to one exemplary embodiment of the disclosed systems and methods.

FIG. 2 is a high level block diagram view of a modular blade server chassis system 100 showing how one or more pre-defined IT service templates 202 may be deployed in one exemplary embodiment by management subsystem 132 from firmware stored in memory 151 and/or from across network 124 by management subsystem 132, e.g., in response to selection or other command received from a user via user interface 133 or command line interface (CLI) as shown. In this regard, the pre-defined service templates 202 may be initially stored in memory 151, and/or may be later retrieved into memory 151 across network 124, e.g., from an external URL such as a system provider Tech Center or from a system provider website. A user may be able to access and select one or more templates 202 to deploy using interface 133, and service processor 110 of management subsystem may respond by retrieving and then provisioning the infrastructure of system 100 based at least in part on the indicated requirements of the selected service template/s 202.

Still referring to FIG. 2, each of the predefined service templates 202 may define the IT resource requirements of one or more IT services for system 100, and may define the desired end-state of the system infrastructure configuration, including end-state configuration and connectivity requirements for compute components 180, networking components 190 and storage components 182/183/184. Example of IT services that may be defined by a service template 202 include, but are not limited to, VMWare ESXi clusters, Windows Hyper-V clusters, Oracle Clusters, Physical workloads such as Exchange. It will be understood that a given predefined service template 202 may define IT resource requirements for only one IT service, or may define IT resource requirements for for multiple different IT services.

In one embodiment, a given IT service template 202 (e.g., a VMware ESXi cluster, virtual desktop infrastructure "VDI", Microsoft Exchange, Oracle Virtualbox, etc.) may include information that specifies the best practice configuration to meet the compute, networking and/or storage infrastructure requirements for a corresponding given IT service implementation, and how they should be connected and configured. The service template 202 may also define minimum pre-requisite components that need to be met by the infrastructure of chassis 100 in order to host the IT service, for example, such as minimum system memory or storage size (e.g., 16 gigabytes) or number and particular type of converged network adapters (CNAs)/network interface controllers (NICs) available on each server blade 180.

Following are examples of IT component resource requirements that may be required by a given infrastructure to host an IT service, it being understood that the listed requirements are exemplary only, and that additional, alternative and/or fewer IT component requirements may be specified in other embodiments.

IT Compute Resource Requirements

Compute Prerequisites—may be used to define the the computer resources that need to be met by the compute resource's of a scalable information handling system (e.g., modular blade servers 180 of a blade server chassis system 100). Examples of such compute pre-requisites include, but are not limited to, minimum required system memory size, minimum specific number of CNAs/NICs, etc.

BIOS Configuration—may be used to define how the BIOS attributes need to be configured, e.g., with virtualization technology (VT) enabled in the BIOS (e.g., such as for hosting ESXi) or with the System Profile set to maximum performance.

Boot Sequence—may be used to define the order in which the compute component needs to boot, e.g., if the user has a centralized pre-boot execution environment (PXE) server, then it should be configured for PXE-booting.

Boot Order—may be used to define the order in which the system platform will attempt to perform a boot.

Multiplicity—may be used to define one or more nodes (e.g., if part of a cluster) that have the same configuration. This may be a pre-defined parameter of the IT service template or may be user-selected (e.g., input by selection via user interface 133 of system 100).

Storage Resource Requirements

Storage Pre-requisites—may be used to define the type of storage that the current IT service template requires to meet the operational needs for the IT environment specified by the current template.

Capacity—may be used to define the size and configuration parameters (e.g., RAID level, thin/thick provisioned, etc.).

Networking Resource Requirements

Network Prerequisites—may be used to define the set of logical and physical networks that are associated with (and required by) the current IT service template. The network set for an ESXi cluster may include, for example, vMotion, Hypervisor Management, VM LAN traffic and iSCSI storage traffic.

Network Bandwidth—may be used to define required configuration parameters for the minimum and/or maximum communication Bandwidth across each network, etc.

Network Connectivity Requirements

Network Physical Connectivity Requirements—if an IT service template has physical networking requirements, the template may include a definition of the physical networking configuration (e.g., LAGs, switch stacking and/or virtual link trunking "VLT" configuration) and associated pre-requisite components required for same. The physical connectivity requirements between the different elements in the IT service definition may be specified, for example, as lines 307 in a resource graph (e.g., see FIG. 3) or as connections in a XML file, e.g., an ESXi compute node may have multiple connections to the logical networks for vMotion, VM LAN traffic, iSCSI storage traffic and hypervisor management.

Figure 3:
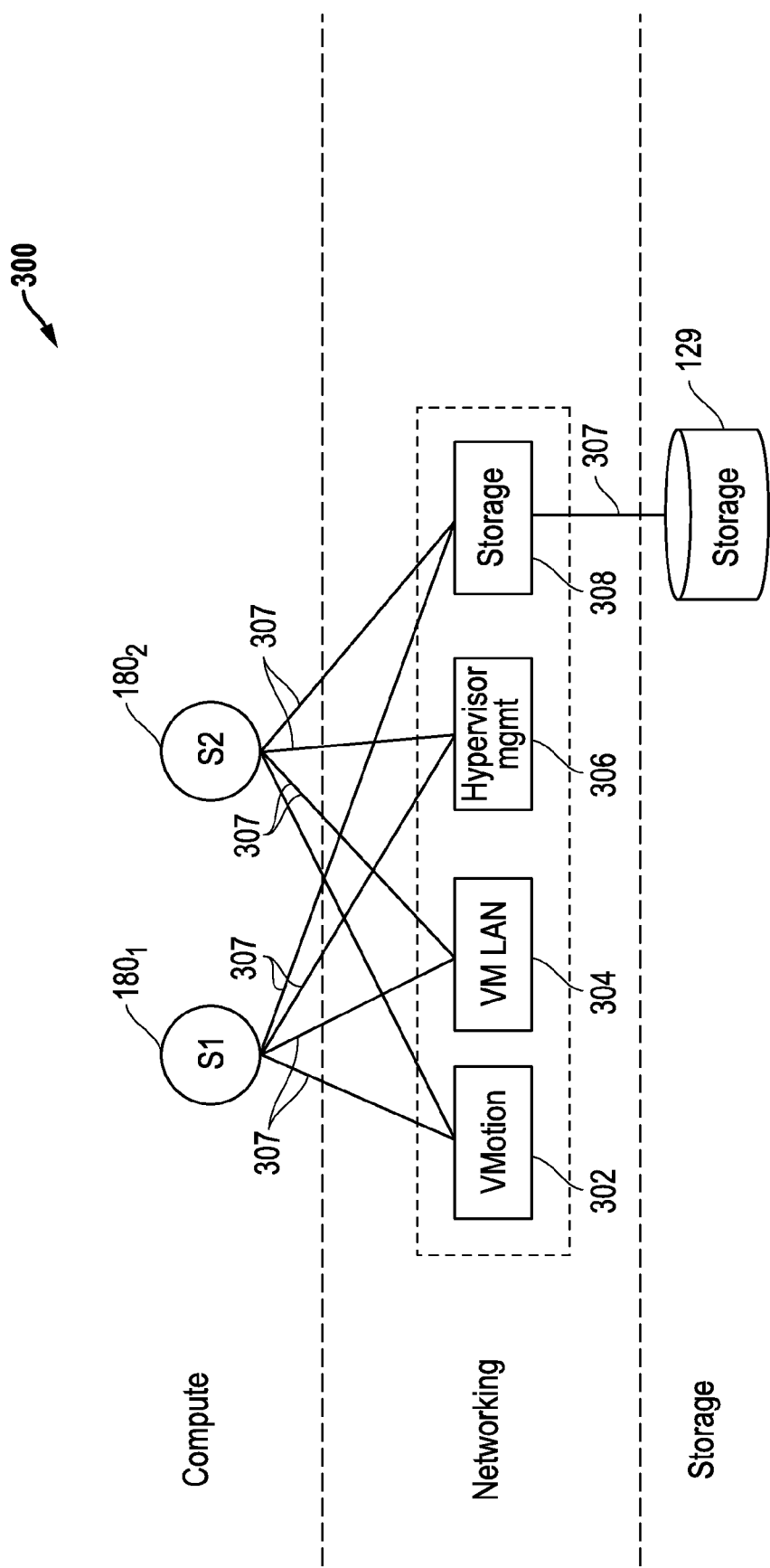
FIG. 3 illustrates a resource graph according to one exemplary embodiment of the disclosed systems and methods.

In the practice of the disclosed systems and methods, IT service template requirements may be represented in any suitable manner, e.g., as an infrastructure or hypervisor resource graph such as illustrated in FIG. 3 or as an XML file that describes the infrastructure pre-requisites, configuration and/or connectivity requirements. For example, in the illustrated exemplary embodiment of FIG. 3 a hypervisor resource graph for a pre-defined two-node ESXi cluster template 300 is illustrated. As shown in FIG. 3, template 300 defines how the compute, networking and storage infrastructure components of a given modular blade server chassis system 100 are to be connected and provisioned to implement the particular ESXi hypervisor corresponding to template 300. As shown, required compute infrastructure components of template 300 includes two blade servers $180_1$ and $180_2$ that are each coupled to interact with multiple networking infrastructure components (i.e., VMotion virtual machine migration networking component 302, VM LAN virtual machine LAN networking component 304, Hypervisor management networking component 306, and storage networking component 308), and storage infrastructure component 129 in the manner shown.

Figure 4:
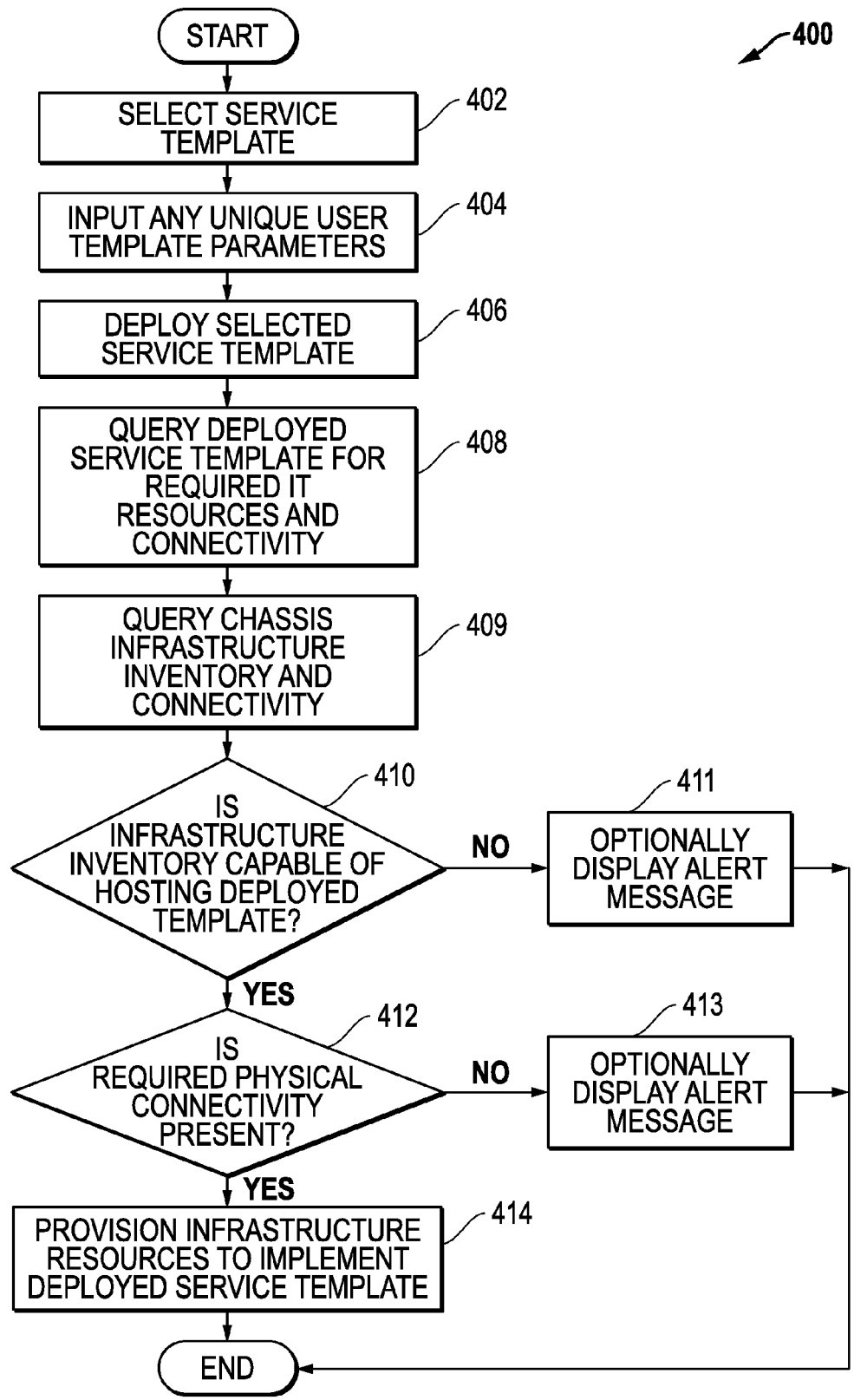
FIG. 4 illustrates methodology according to one exemplary embodiment of the disclosed systems and methods.

FIG. 4 illustrates one exemplary embodiment of a methodology 400 that may be employed to configure the infrastructure of a modular blade server chassis system such as illustrated and described in relation to FIG. 1 herein. Although described in relation to the exemplary system embodiments of FIGS. 1-3, it will be understood that methodology 400 may be employed with other configurations of scalable information handing systems having any other configuration of modular or replaceable/removable compute, networking and/or storage components.

As shown, methodology 400 starts in step 402 where a particular IT service template 202 is selected, and the proceeds to step 404 where a set of template parameters that are unique to a given user's environment (e.g., such as VLAN identifier information) may be optionally input, e.g., in both cases entered by a user using a UI or CLI 133. In this regard, certain installation-specific parameters unique to a given environment may be entered by a user in step 404 (e.g., corresponding to customer environment settings that are unique to each customer) as part of a template deployment process. Examples of such unique user information include, but are not limited to, 10-bit VLAN I.D.

Next, in step 406, the selected IT service template 202 is deployed, e.g., by management subsystem 132. CMC firmware locally executing on the service processor 110 then queries the selected template 202 in step 408 for the required IT resources and any physical connectivity needed for same. Examples of such IT resource requirements include pre-requisite compute, networking and storage components, and associated capabilities and connectivity of same that are required for implementation of one or more IT services of the deployed template 202. In step 409, CMC firmware locally executing on the service processor 110 queries the chassis infrastructure inventory (e.g., via management communication paths 161) to determine the identity and capabilities of particular infrastructure IT resources and/or physical connectivity topology that are actually present within the current infrastructure of chasses 100 (e.g., server blades 180, CM's 160/162/164, IOM's 190, fabric links 185, etc.).

Next, in step 410, the local CMC firmware evaluates the determined IT resources required by the selected service template 202 and determines if the current infrastructure of chassis system 100 has the capability to host the selected service template 202 by determining if the chassis system 100 currently has the required infrastructure IT resources (e.g., pre-requisites and capabilities) required to implement the IT service/s of the selected service template 202 (where a given IT service template 202 includes multiple IT services, then the local CMC firmware may determine if the current infrastructure of chassis system 100 has has the required infrastructure IT resources required to implement all of the IT service/s of the selected service template 202). If not, then an alert message may be optionally displayed or otherwise output in step 411 to a user (e.g., on UI 133) that indicates to the user that the current infrastructure of chassis system 100 does not have the capability to host the selected service template 202 and may optionally provide further information to indicate what infrastructure components are missing and/or are insufficient.

However, if the current infrastructure of chassis system 100 is determined in step 410 to have the capability to host the deployed service template 202, then methodology 400 proceeds to step 412, where the locally executing CMC firmware evaluates the physical connectivity between different IT resource components required by the selected and deployed template 202 to determine if it can be fulfilled by matching it with the inventoried physical connectivity topology actually available between different IT resource components present within the chassis 100. If not, then an alert message may be optionally displayed in step 413 to a user (e.g., on UI 133) that indicates to the user that the current physical connectivity of chassis system 100 is not capable of hosting the selected service template 202 and may optionally provide further information to indicate details on what aspects of the required physical connectivity topology is missing (e.g., missing interconnection links) or is insufficient (e.g., due to insufficient bandwidth).

However, if the physical connectivity of chassis 100 is determined in step 412 to be sufficient to fulfill the physical connectivity requirements of the selected and deployed template 202, then methodology 400 proceeds to step 414 where CMC firmware executing on the service processor 132 provisions the infrastructure resources (e.g., compute, networking and/or storage components) of chassis 100 in a configuration suitable for implementing the requirements of deployed service template 202, e.g., in a manner as illustrated in FIG. 3. Examples of such provisioning tasks that may be taken by CMC firmware executing on the service processor 132 include provisioning the compute infrastructure (e.g., BIOS, boot sequence, internal RAID drives, CAN's, etc.), configuring iSCSI storage (e.g., size, thin/thick provisioning, etc.) or configuring DAS storage (e.g., size, RAID level, etc.), and making assignments to compute and configure the network fabric parameters (stacking, link aggregation groups "LAGs", virtual local area networks "VLANs").

It will be understood that the particular type/s and number of executed provisioning tasks (e.g., executed by one or more processing devices of management subsystem 132) may differ depending on the particular chassis configuration, e.g., particular combination of IT resources actually present and available in a particular platform, particular actual available connectivity between the chassis IT resources, revisions of firmware and software present available on the chassis system, etc.

Moreover, it will also be understood that the illustrated steps and order of steps shown in FIG. 4 are exemplary only, and that any other combination of additional, fewer or alternative steps may be employed that is suitable for accomplishing provisioning of the infrastructure of a modular information handling system using one or more predefined IT service templates.

It will be understood that one or more of the tasks, functions, or methodologies described herein (e.g., including those performed by management subsystem 132) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A scalable information handling chassis system having chassis information technology (IT) resources, the chassis system comprising one or more network devices and at least one processing device integrated into a single chassis, the at least one processing device configured to:

perform a template query of a selected locally deployed IT service template to determine required IT resources and connectivity for at least one IT service,
where the selected locally deployed IT service template defines the resource requirements for implementing the at least one IT service on the scalable information handling chassis system, the defined resource requirements comprising a combination of multiple required chassis IT resources and the required physical connectivity between the multiple chassis IT resources;

perform an inventory query to determine the identity and capabilities of physical chassis IT resources of the information handling chassis system and an physical connectivity between the physical chassis IT resources of the information handling chassis system;

based on the template and inventory queries, evaluate the determined required IT resources and connectivity for the at least one IT service by:
determining if the physical chassis IT resources of the information handling chassis system are capable of implementing the at least one IT service based on the determined required IT resources and connectivity, and
determining if the physical connectivity between the physical chassis IT resources of the information handling chassis system is capable of fulfilling the required physical connectivity between the chassis IT resources to implement the at least one IT service based on the determined required IT resources and; and based on the evaluation of the determined IT resources and connectivity, provision the infrastructure of the scalable information handling chassis system according to the selected locally deployed IT service template based on:
the physical chassis IT resources of the information handling chassis system being determined to be capable of implementing the at least one IT service of the selected locally deployed IT service template, and the physical connectivity between the physical chassis IT resources of the information handling chassis system being determined to be capable of fulfilling the required physical connectivity between the chassis IT resources of the selected locally deployed IT service template.

2. The system of claim 1, where the chassis IT resources of the information handling chassis system comprise a combination of IT compute resources, IT networking resources, and storage resources.

3. The system of claim 1, where the at least one local processing device of the information handling chassis system is configured to perform the template query of the selected locally deployed IT service template to determine the combination of multiple IT resource requirements for implementing the at least one IT service on the scalable information handling chassis system.

4. The system of claim 1, where the at least one local processing device of the information handling chassis system is configured to perform at least one of the following steps:
output an alert message if the physical chassis IT resources of the information handling chassis system are determined not to be capable of implementing the at least one IT service of the selected locally deployed IT service template, or
output an alert message if the physical connectivity between the chassis IT resources of the information handling chassis system is not capable of fulfilling the required physical connectivity between the chassis IT resources of the selected locally deployed IT service template.

5. The system of claim 1, where the at least one local processing device of the information handling chassis system is configured to perform the template query of the selected locally deployed IT service template to determine the combination of resource requirements for implementing the at least one IT service on the scalable information handling chassis system.

6. The system of claim 5, where the selected locally deployed IT service template defines the desired end-state of the system infrastructure configuration that includes a configuration of a combination of compute, networking and storage resources, and physical connectivity requirements between the combination of compute, networking and storage resources to enable the system infrastructure to host the at least one IT service.

7. The system of claim 5, where the scalable information handling chassis system comprises a modular blade server chassis system; and where the IT compute resources comprise one or more modular blade servers.

8. The system of claim 1, where the at least one local processing device of the information handling chassis system is configured to
download the selected locally deployed IT service template into local memory or storage of the scalable information handling chassis system from a source external to the scalable information handling chassis system.

9. The system of claim 1, where the at least one local processing device of the information handling chassis system is configured to accept one or more template parameters entered by a user for inclusion into a pre-defined IT service template; and then to deploy the pre-defined IT service template as the selected locally deployed IT service template.

10. The system of claim 1, where the at least one local processing device of the information handling chassis system is configured to accept a user selection identifying a particular pre-defined IT service template; and then to deploy the identified pre-defined IT service template as the selected locally deployed IT service template.

11. The system of claim 1, where the determined physical connectivity between the physical chassis IT resources of the information handling chassis system is a determined physical connection topology that includes the determined presence of physical interconnection links between hardware components of the physical chassis IT resources within the chassis of the information handling system.

12. The system of claim 1, where the chassis IT resources of the information handling chassis system comprise a combination of IT compute resources that include one or more blade servers, IT networking resources that include a networking infrastructure, and storage resources that include an external storage device coupled to the information handling system.

13. The system of claim 1, where the chassis IT resources of the information handling chassis system comprise hardware components of the information handling system.

14. A method for provisioning the infrastructure of a scalable information handling chassis system having chassis information technology (IT) resources, the chassis system comprising one or more network devices and at least one processing device integrated into a single chassis, the method comprising:
using the at least one processing device of the information handing chassis system to perform a template query of a selected locally deployed IT service template to determine required IT resources and connectivity for at least one IT service,
where the selected locally deployed IT service template defines the resource requirements for implementing the at least one IT service on the scalable information handling chassis system, the defined resource requirements comprising a combination of multiple required chassis IT resources and the required physical connectivity between the multiple chassis IT resources;
using the at least one processing device of the information handing chassis system to perform an inventory query to determine the identity and capabilities of physical chassis IT resources of the information handling chassis system and an physical connectivity between the physical chassis IT resources of the information handling chassis system;
using the at least one processing device of the information handling chassis system to evaluate the determined required IT resources and connectivity for the at least one IT service based on the template and inventory queries, by:
determining if the physical chassis IT resources of the information handling chassis system are capable of implementing the at least one IT service based on the determined required IT resources and connectivity, and
determining if the physical connectivity between the physical chassis IT resources of the information handling chassis system is capable of fulfilling the required physical connectivity between the chassis IT resources to implement the at least one IT service based on the determined required IT resources and connectivity; and using at least one local processing device of the information handling chassis system to provision the infrastructure of the scalable information handling chassis system according to the selected locally deployed IT service template based on the evaluation of the determined IT resources and connectivity and based on:

the physical chassis IT resources of the information handling chassis system being determined to be capable of implementing the at least one IT service of the selected locally deployed IT service template, and the physical connectivity between the chassis IT resources of the information handling chassis system being determined to be capable of fulfilling the required physical connectivity between the chassis IT resources of the selected locally deployed pre-defined IT service template.

15. The method of claim 14, where the chassis IT resources of the information handling chassis system comprise a combination of IT compute resources, IT networking resources, and storage resources.

16. The method of claim 14, further comprising using the at least one local processing device of the information handling chassis system to perform the template query of the selected locally deployed IT service template to determine the combination of multiple IT resource requirements for implementing the at least one IT service on the scalable information handling chassis system.

17. The method of claim 14, further comprising using the at least one local processing device of the information handling chassis system to perform at least one of the following steps:
output an alert message if the physical chassis IT resources of the information handling chassis system are determined not to be capable of implementing the at least one IT service of the selected locally deployed IT service template, or
output an alert message if the physical connectivity between the chassis IT resources of the information handling chassis system is not capable of fulfilling the required physical connectivity between the chassis IT resources of the selected locally deployed IT service template.

18. The method of claim 14, further comprising
using the at least one local processing device of the information handling chassis system to perform the template query of the selected locally deployed IT service template to determine the combination of resource requirements for implementing the at least one IT service on the scalable information handling chassis system.

19. The method of claim 18, where the selected locally deployed IT service template defines the desired end-state of the system infrastructure configuration that includes a configuration of a combination of compute, networking and storage resources, and physical connectivity requirements between the combination of compute, networking and storage resources to enable the system infrastructure to host the at least one IT service.

20. The method of claim 18, where the scalable information handling chassis system comprises a modular blade server chassis system; and where the IT compute resources comprise one or more modular blade servers.

21. The method of claim 14, where the selected locally deployed IT service template is initially loaded and already present in local memory or storage of the scalable information handling chassis system prior to beginning the steps of the method.

22. The method of claim 14, further comprising using the at least one local processing device of the information handling system to download the selected locally deployed IT service template into local memory or storage of the scalable information handling chassis system from a source external to the scalable information handling chassis system.

23. The method of claim 14, further comprising using the at least one local processing device of the information handling chassis system to accept one or more template parameters entered by a user for inclusion into a pre-defined IT service template; and then deploying the pre-defined IT service template as the selected locally deployed IT service template.

24. The method of claim 14, further comprising using the at least one local processing device of the information handling chassis system to accept a user selection identifying a particular pre-defined IT service template prior to deploying the selected pre-defined IT service template as the selected locally deployed IT service template.

25. The method of claim 14, where the chassis IT resources of the information handling chassis system comprise hardware components of the information handling system.

26. The method of claim 14, further comprising using the at least one local processing device of the information handling chassis system to perform the inventory query to determine a physical connection topology that includes the presence of physical interconnection links between hardware components of the physical chassis IT resources within the chassis of the information handling system; and using the at least one processing device of the information handling chassis system to evaluate the determined required IT resources and connectivity for the at least one IT service based on the template and inventory queries by determining if the determined physical interconnection links of the physical connection topology between hardware components of the physical chassis IT resources within the chassis of the information handling system are capable of fulfilling the required physical connectivity between the chassis IT resources to implement the at least one IT service of the selected locally deployed IT service template.

27. The method of claim 14, where the chassis IT resources of the information handling chassis system comprise a combination of IT compute resources that include one or more blade servers, IT networking resources that include a networking infrastructure, and storage resources that include an external storage device coupled to the information handling system.

* * * * *